Oct. 31, 1967  R. C. WILLIAMS  3,350,146
RAILROAD CAR TRUCK SIDE BEARING AND BOLSTER RETAINER
Filed Dec. 11, 1964
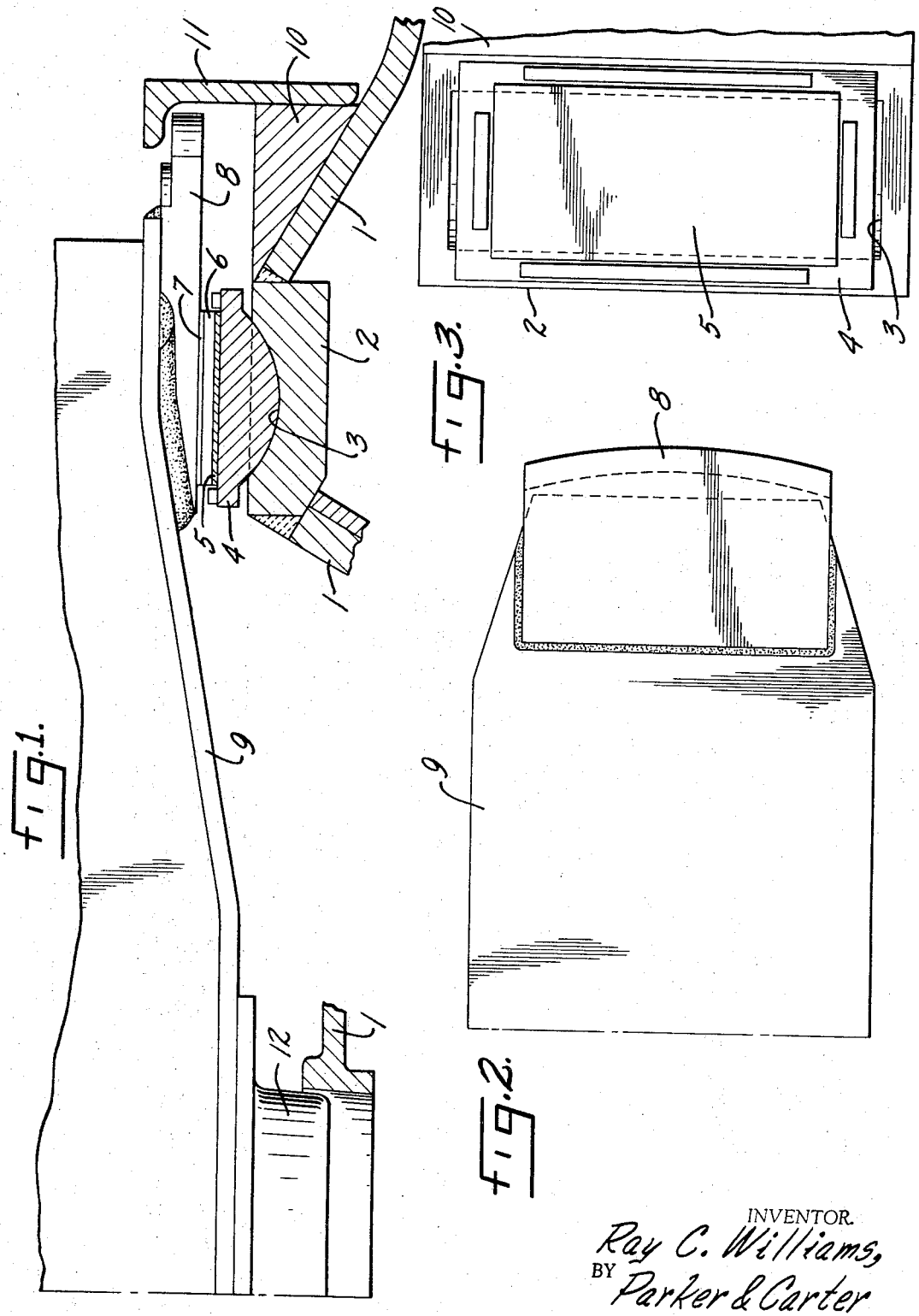
INVENTOR.
Ray C. Williams,
BY Parker & Carter
Attorneys.

United States Patent Office 3,350,146
Patented Oct. 31, 1967

3,350,146
RAILROAD CAR TRUCK SIDE BEARING
AND BOLSTER RETAINER
Ray C. Williams, Chicago, Ill., assignor to Standard Car Truck Company, Chicago, Ill., a corporation of New Jersey
Filed Dec. 11, 1964, Ser. No. 417,622
2 Claims. (Cl. 308—138)

ABSTRACT OF THE DISCLOSURE

A side bearing for railroad car and truck combinations including a loosely socketed rockable bearing, a side bearing pad between the car bolster and the truck bolster and means for positively limiting separation of the two bolsters to prevent escape of the pad from between them.

This invention relates to improvements in side bearing and bolster retainer for railroad car trucks and has for one object to provide a side bearing for the type of railroad car truck and car combination where all the load is carried by the side bearings, the center plates serving merely as a pivot to maintain the car truck and the body in working relation.

Another object is to provide a side bearing and bolster retainer combination wherein the side bearing elements on the car truck and on the car body are held in working relationship and excess separation thereof is inhibited.

Another object is to provide in a railroad car and car truck side bearing combination a minimum of friction resistance to angular displacement of car and truck.

This invention is especially useful in connection with the device of co-pending application Ser. No. 391,138, filed Aug. 21, 1964, but is of usefulness in connection with any railroad car and truck body combination where a load carrying side bearing is present. The details of the car body and car truck being adequately disclosed in the above mentioned application are—in the interest of clarity and brevity—omitted in this application.

Other objects will appear from time to time throughout the specification and claims.

The invention is illustrated more or less diagrammatically in the accompanying drawings, wherein:

FIGURE 1 is a half section through a railroad car truck bolster taken in a vertical plane generally perpendicular to the center line of the car;

FIGURE 2 is a bottom plan view on a reduced scale of a car body bolster cover plate with car and car body bolster omitted;

FIGURE 3 is a top plan view of rocker bearing pad and channel.

Like parts are indicated by like characters throughout the specification and drawings.

The car truck bolster 1 extends across the truck in the usual manner, being supported at its right hand end in FIGURE 1 by the inner truck frame and extending across the truck to be supported at its left hand end by the other truck frame. The details of the mounting of center plates on the center line of the car are omitted.

The assembly disclosed in FIGURES 1 and 2 is a built up assembly but it might well be cast. The support block or bearing lug 2 projects above and may be welded to the truck bolster 1, as indicated. It has on its upper face, a cylindrical channel 3 to receive the truncated spherical base of the rocker bearing pad 4. The particular contour of the rocker bearing pad may vary. It may fit the channel. It may be smaller in diameter than the channel. It could be cylindrical or spherical. The point is that it interlocks with the channel, is guided therealong and cannot escape from the channel as long as the body is held in working relationship with and immediately above the channel. The upper surface of the rocker bearing pad carries a steel plate 5 faced with the anti-friction bearing surface 6 which in turn is engaged by another anti-friction bearing surface 7 on the under face of the body side bearing bracket plate 8. This bracket plate may be, as shown, welded to the car body bolster plate 9 and extends beyond the end thereof though they might be cast in one. Welded to the truck bolster on the right hand or outboard side of the support block 2 is an abutment block 10. Bolted to this is an L-shaped bolster retainer 11 which overhangs the outboard end of the body side bearing bracket plate.

The elements 1, 2 and 10, might, if desired, be cast integral. The bolster retainer where it overlies the outer end of the body side bearing shim plate is out of contact therewith but the clearance between them is such that if the car rocks beyond the safety point, the retainer will limit the upward movement of the car so that the rocker bearing pad cannot escape from between the support block and the body side bearing bracket plate. The outboard end of the body side bearing bracket plate may preferably be curved as indicated, about a radius concentric to the center of the center plates and the same may be true of the abutment block 10, the bolster retainer 11 and the channel 3. However, under some circumstances, the block, the retainer and the shim plate may all be parallel with the center line of the car, there being sufficient clearance to permit angular movement of car and truck about the center plate without interference.

Clearance between the spherical rocker bearing pad and the groove in the support block permits such angular displacement without substantially interfering with the relative angular movement of car and truck.

The male center plate 12 carried by the body bolster plate 9 penetrates the female bolster plate on the car truck bolster 1 but the clearance between the elements is such that no vertical load may be applied to the center plate, the entire weight of the car being carried by the bearing pad 4 and its associated parts.

I claim:

1. A truck and car bolster combination for railroad cars, including a side bearing, loosely socketed between the bolsters including a pad having a truncated cylindrical face on the one side thereof and a plane anti-friction face on the other side thereof, a truncated cylindrical socket on one of the bolsters adapted to receive and be penetrated by the cylindrical face on the pad, a side bearing bracket on the other bolster, adapted to engage the plane anti-friction face of the pad, means interposed between the two bolsters to positively limit vertical separation thereof to an amount less than the depth of penetration of the cylindrical face in the cylindrical socket.

2. The device of claim 1 characterized by the fact that the bracket extends outwardly beyond the end of the car bolster and beyond the socket therein, a bolster retainer extends upwardly from the truck bolster and overhangs the end of the bracket.

References Cited

UNITED STATES PATENTS

| 311,553 | 2/1885 | Wilson | 105—199 |
| 427,966 | 5/1890 | Brill et al. | 105—50 |
| 516,935 | 3/1894 | Kling | 105—199 |
| 1,056,943 | 3/1913 | Rohlfing | 308—226 |
| 1,868,530 | 7/1932 | Harley et al. | 308—138 |

FOREIGN PATENTS 1,108,255 6/1961 Germany.

ARTHUR L. LA POINT, Primary Examiner.
H. BELTRAN, Assistant Examiner.